United States Patent
Kizu et al.

(10) Patent No.: US 7,808,950 B2
(45) Date of Patent: Oct. 5, 2010

(54) RADIO COMMUNICATION APPARATUS AND RADIO COMMUNICATION METHOD

(75) Inventors: Toshiki Kizu, Yokohama (JP); Yoshimitsu Shimojo, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 361 days.

(21) Appl. No.: 11/257,001

(22) Filed: Oct. 25, 2005

(65) Prior Publication Data
US 2006/0089149 A1 Apr. 27, 2006

(30) Foreign Application Priority Data
Oct. 26, 2004 (JP) ............................ 2004-311304

(51) Int. Cl.
*H04W 4/00* (2009.01)
(52) U.S. Cl. .................. 370/331; 370/329; 370/333; 370/341; 455/450; 455/509; 455/422.1; 375/132
(58) Field of Classification Search ............... 455/450, 455/509, 422.1; 370/331, 333, 329, 341
See application file for complete search history.

(56) References Cited

U.S. PATENT DOCUMENTS 6,169,761 B1 * 1/2001 Marcoccia et al. .......... 375/132
2002/0116460 A1 * 8/2002 Treister et al. ............. 709/204
2003/0129954 A1 * 7/2003 Shimizu ..................... 455/295
2006/0034220 A1 * 2/2006 Shinshou .................... 370/329
2007/0230541 A1 * 10/2007 Haartsen .................... 375/135

FOREIGN PATENT DOCUMENTS

JP 2005-130122 5/2005

OTHER PUBLICATIONS

"Specification of the Bluetooth System", vol. 2, Version 1.2, Nov. 5, 2003, pp. 161-162.

* cited by examiner

*Primary Examiner*—Ajit Patel
*Assistant Examiner*—Khai M Nguyen
(74) *Attorney, Agent, or Firm*—Oblon, Spivak, McClelland, Maier & Neustadt, L.L.P.

(57) ABSTRACT

A radio communication apparatus determines whether a reception signal is received normally. The apparatus measures strengths of the reception signal, assesses frequency channels using a result whether the reception signal is received normally and a strength of the reception signal, and decides that zero or more of the frequency channels as unusable channel in accordance with a result of an assessment of the frequency channels. The apparatus transmits a radio signal using one of the frequency channels sequentially without using the unusable channel.

10 Claims, 3 Drawing Sheets

| Channel number | 1 | 2 | 3 | ... | 79 |
|---|---|---|---|---|---|
| Number of times of reception | 10 | 15 | 8 | ... | 12 |
| Number of reception error | 1 | 2 | 7 | ... | 5 |
| Frequency of reception errors | 0.10 | 0.13 | 0.88 | ... | 0.42 |
| Usable / unusable | ○ | ○ | × | ... | × |

RADIO COMMUNICATION APPARATUS AND RADIO COMMUNICATION METHOD

CROSS-REFERENCE TO RELATED APPLICATIONS

This application is based upon and claims the benefit of priority from prior Japanese Patent Application No. 2004-311304, filed Oct. 26, 2004, the entire contents of which are incorporated herein by reference.

BACKGROUND OF THE INVENTION

1. Field of the Invention

The present invention relates to a radio communication apparatus and a radio communication method, and more particularly to a radio communication apparatus which performs frequency hopping by using some frequency channels.

2. Description of the Related Art

The 2.4 GHz band is a radio frequency band in which radio communication systems such as radio communication apparatuses that perform and do not perform the frequency hopping coexist. The frequency hopping is a system for communicating while changing frequency channels to be used at every fixed period (for example, 625 µs) from frequency channels. A device pursuant to the Bluetooth specification (hereinafter, referred to as a Bluetooth device) is a typical radio communication apparatus that performs frequency hopping. In contrast, a station and an access point pursuant to IEEE 802.11b or IEEE 802.11g referred to as a so-called wireless local area network (LAN) are typical radio communication apparatuses that do not perform frequency hopping.

Simultaneous generation of radio signals in identical frequency channels by means of Bluetooth devices, wireless LAN stations and access points cause radio wave interference. As a result, packets are corrupted and the packets are not received at all to cause a communication quality to be degraded. To avoid such radio wave interference, the Bluetooth communication system has a function called adaptive frequency hopping (AFH) to perform the frequency hopping while avoiding the frequency channel now used in the wireless LAN, etc. In the AFH function, a frequency channel assessment is important. A Bluetooth device autonomously assesses a surrounding radio environment and automatically detects a frequency channel with an interference source such as a wireless LAN exists therein.

Two methods of an active assessment system and a passive assessment system as this frequency channel assessment system are known.

In active assessment system, a radio communication device records frequencies of reception errors in packet receiving operations for each frequency channel so as not to use frequency channels apt to cause reception errors. However, active assessment system cannot distinguish between the case in which a device cannot receive packets because the communication partner device sent no signal or is out of a communication range and the case in which the device cannot receive packets because of the radio wave interference. That is, since any case is determined as reception errors, it is hard to accurately distinguish the frequency channels affected with the interference.

In the passive assessment system, a radio communication device uses a timing of non-transmission and non-reception of packets to measure a received signal strength indicator (RSSI) value so as not to use a frequency channel with a large RSSI value. This system is based on the assumption that when other device uses the frequency channel, a large RSSI value will be measured. However, since the passive assessment system utilizes timing of non-transmission and non-reception of the packet, it cannot measure the RSSI value in continuous transmissions and receptions of packets by the other partner device. In the Bluetooth device, a device transmits and receives packets almost continuously for example when performing voice transfer using an HV1 packet type. In this case, the passive assessment system cannot assess the frequency channel. And the passive assessment system needs to operate the transmitter only to measure the RSSI value, and has a problem to increase consumption of power.

BRIEF SUMMARY OF THE INVENTION

According to a first aspect of the present invention, there is provided a radio communication apparatus which determines whether a reception signal is received normally, measures strengths of the reception signal, assesses frequency channels using a result whether the reception signal is received normally and a strength of the reception signal, decides that zero or more of the frequency channels as an unusable channel in accordance with a result of an assessment of the frequency channels, and transmits a radio signal using one of the frequency channels sequentially without using the unusable channel.

According to a second aspect of the present invention, there is provided a radio communication apparatus communicating while using one of frequency channels sequentially, comprising: a reception error determining section determining whether a reception signal is normally received and outputting an error signal when the reception signal is not received normally; a reception signal strength measuring section measuring a reception signal strength of the reception signal and outputting a signal strength signal; an interference channel detection section receiving the signal strength signal, calculating frequency of an incident in which the error signal is received and the signal strength of the reception signal which is not received normally exceeds a first threshold among a number of times of reception of the reception signal for each of the frequency channels, and storing zero or more of the frequency channels in which the frequency exceeds a second threshold as a unusable channel; and a transmitting section transmitting a radio signal using one of the frequency channels sequentially without using the unusable channels.

According to a third aspect of the present invention, there is provided a radio communication method for communication using one of frequency channels sequentially, comprising: receiving a reception signal; determining whether the reception signal is received normally; measuring a strength of the reception signal; calculating frequency of an incident in which the reception signal is not received normally and the signal strength of the reception signal which is not received normally exceeds a first threshold among a number of times of reception of the reception signal for each of the frequency channels; storing zero or more of the frequency channels in which the frequency exceed a second threshold as unusable channel; and transmitting a radio signal using one of the frequency channels sequentially without using the unusable channel.

DETAILED DESCRIPTION OF THE INVENTION

Hereinafter, embodiments of the present invention will be described with reference to the drawings. In the description below, constituent elements having almost same functions and configurations are put the same reference marks and duplicate description will be given if necessary.

First Embodiment

The first embodiment of the present invention will be described with a Bluetooth device taken as an example.

Figures 1, 2:
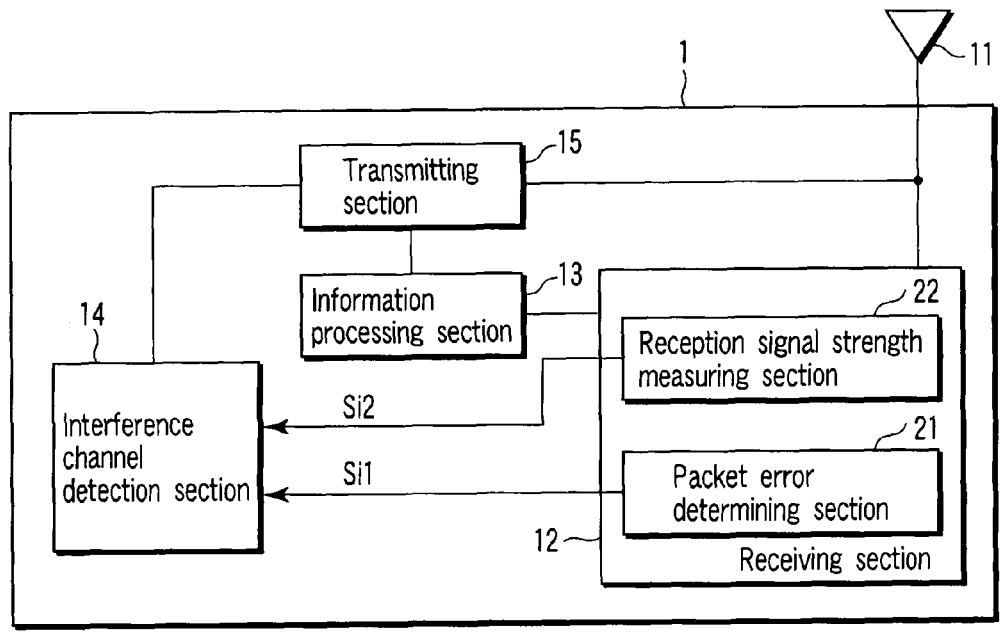
FIG. 1 is a block diagram schematically sowing a radio communication apparatus regarding a first embodiment of the present invention.
FIG. 2 is a view showing an example of a table stored by an interference channel detection section.

As shown in FIG. 1, a transmitted signal from communication partner device is supplied to a receiving section 12. The receiving section 12 demodulates the reception signal received by a radio communication apparatus 1 into a baseband signal, decodes the baseband signal and decodes a content of a packet of the decoded signal. The packet decoded by the receiving section 12 is supplied to an information processing section 13 such as a central processing unit (CPU) to perform a variety of types of information processing and control for the decoded packet.

The receiving section 12 has a packet error determining section (reception error determining section) 21 and a reception signal strength measuring section 22. The decoded packet is supplied to the packet error determining section 21 to decode the content thereof. The determining section 21 outputs a signal Si1 indicating the packet reception is error resulting from fact, for example, that the content of the packet is broken, or the receiving section 12 could not receive the packets at all even though the reception can be expected, or the receiving section 12 incompletely received the packets because the radio signal was very weak, or interference with another radio signal even though the radio signal was strong.

The reception signal is supplied to the measuring section 22. The measuring section 22 measures the RSSI value at the frequency channel in which the radio signal has been received at every reception of the packets by the receiving section 12 and outputs a signal Si2 as the result. Since the measurement of the RSSI value is performed during a receiving operation of the communication apparatus 1, the receiving section 12 does not consume extra power only for measuring the RSSI value. That is, it is avoided that the receiving section 12 consumes power only to measure the RSSI value separately from transmitting and receiving operations of the packets as before.

The signals Si1 and Si2 are supplied to an interference channel detection section 14 to detect a frequency channel with an interference source assumed to exist therein by using the signals Si1 and Si2. That is, firstly, when receiving the signal Si1 from the packet error determining section 21, the detection section 14 obtains, by the signal Si2, the RSSI value of the radio signal in which the packet has been included. When the RSSI value is larger than the preset threshold Th1, the detection section 14 determines that the receiving operation which has received the packet is an error resulting from the interference.

The detection section 14 counts the number of times of reception and the number of times of determination that the receiving operations are errors (of reception errors) in each frequency channel. And the detection section 14 stores the frequency of the reception errors caused by the interference in each frequency channel (the number of times of reception error/the number of times of reception) in a table form shown in FIG. 2. When the reception error frequency exceeds a threshold Th2, the detection section 14 determines that the interference source exists in the frequency channel in which the frequency of the reception errors caused by the interference has exceeded the threshold Th2. And as shown in FIG. 2, the detection section 14 stores such frequency channel as an unusable channel.

The detection section 14 supplies an assessment result (usable or unusable) of the frequency channel to a transmitting section 15. The transmitting section 15 transmits transmission data supplied from the information processing section 13 in accordance with a transmission processing command supplied from the information processing section 13 while using the assessment result of the frequency channel. That is to say, the transmitting section 15 transmits a radio signal while performing frequency hopping without using the unusable channel.

Timing to set the unusable channel again to a usable channel can be decided as follows. That is, the wireless LAN interferes in Bluetooth only when the wireless LAN stations and the access points transmit and receive data. If no data is transmitted or received, the interference in Bluetooth does not occur even in the frequency channel currently used by the wireless LAN. Accordingly, a Bluetooth device is likely to receive the radio signal interference if it resumes to use an unusable channel immediately after the interference has disappeared. Therefore, in this embodiment, the unusable channel stays unusable until the radio wave interference keeps undetected for a time set by, for example, a timer. The time is appropriately set and the communication device 1 does not carelessly use again the frequency channel in which the interference source is detected so as to keep the interference from occurring. In other words, for example, even when the interference source transmits the radio signal sporadically, the communication apparatus 1 can avoid the radio wave interference stably without switching the setting of using or not using of the frequency channel more than necessary.

Figure 3:
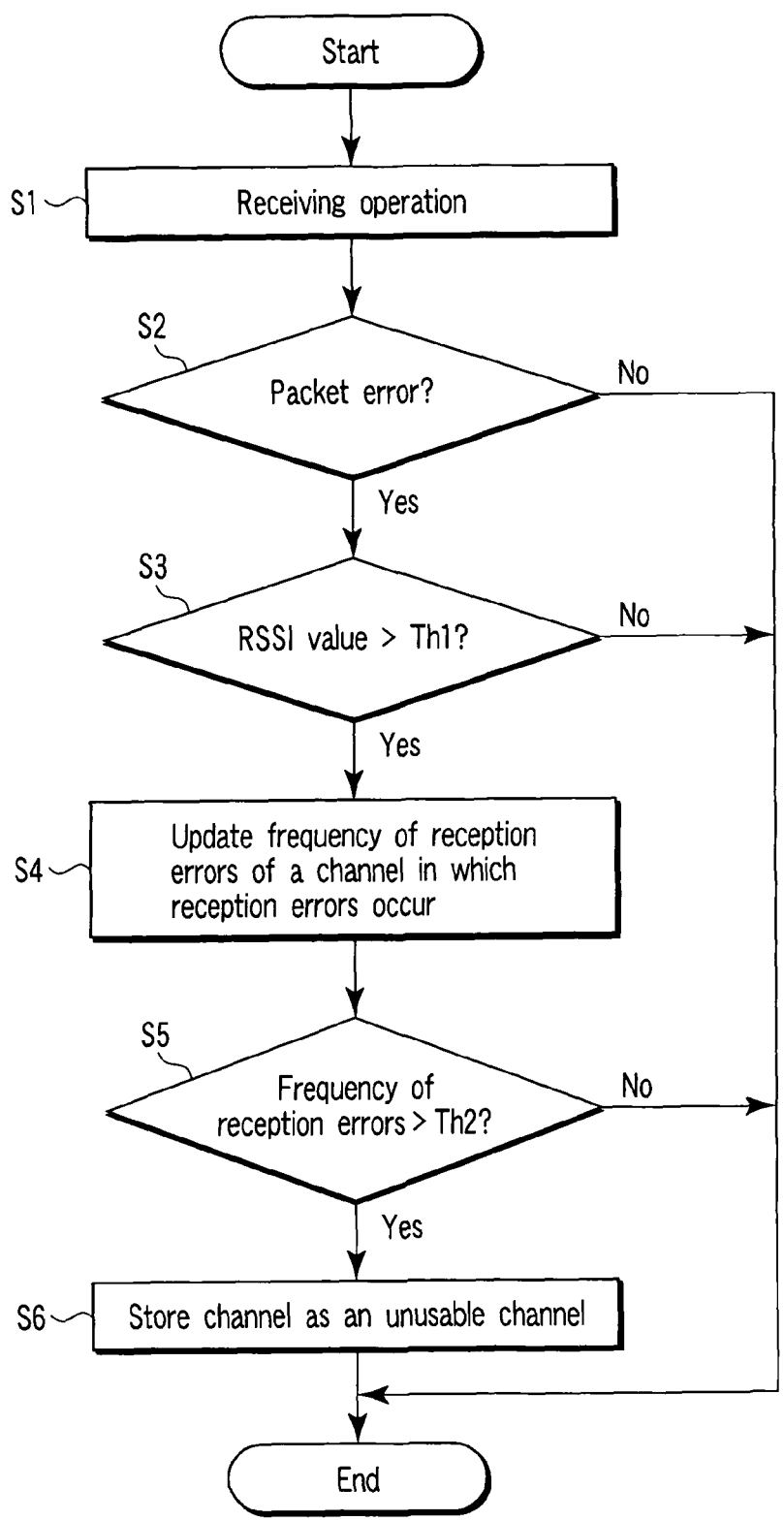
FIG. 3 is a flowchart showing processes of detecting a frequency channel with interference existed therein.

Next, operations in the communication apparatus 1 will be described by referring to FIG. 3. FIG. 3 is the flowchart showing processes of detecting the frequency channel with the interference existing therein. This flow is conducted at every reception of packets.

As shown in FIG. 3, after receiving operation (step S1), the communication apparatus 1 observes the reception signal (packet) to determine whether or not the reception signal has been normally received (step S2). In the case of a normal reception, the communication apparatus 1 terminates the process. In contrast, in the case of an abnormal reception, the interference channel detection section 14 compares the RSSI value in the frequency channel through which the packet determined as the packet error has been transmitted to the threshold Th1 (step S3). If the RSSI value is not more than the threshold Th1, the communication apparatus 1 terminates the process. The threshold Th1 may be set to an RSSI value necessary for communication which is defined, for example, in the specifications of the wireless LAN and the Bluetooth device.

In step S3, when the RSSI value exceeds the threshold Th1, the detection section 14 determines that the reception operation resulted in the reception errors caused by the interference source. Like this, the detection section 14 treats the frequency channel, through which the packet with the packet error and the RSSI value exceeding a threshold have been transmitted, as information for determining that an interference source exists in the frequency channel. Because, if the packet determined as the packet error has been transmitted through the frequency channel and if the frequency channel has a large RSSI value, it is estimated that the interference source exists in the frequency channel. On the other hand, if the detection section 14 assesses the frequency channel only by the existence of the packet errors, the frequency channel might be determined erroneously as one with the interference source existing therein, even when no packets are received and the extreme weakness of the radio signal causes reception errors.

In contrast, the RSSI value is small (not more than the threshold Th1) even when the packet errors occurs in the frequency channel, it is assumed that the interference source does not exist in the frequency channel through which the packets have been transmitted. Therefore, the packet errors are not counted as the information for determining interference source exists in the frequency channel. The RSSI value is not an index for the assessment of the frequency channel, because the RSSI value without a packet error is the RSSI value of a normal packet from the communication partner.

When the determination in step S3 is "true", the communication apparatus 1 updates the frequency of the reception errors calculated from the number of the times of receptions and the reception errors in respect with the frequency channel in which the reception operation is performed (step S4).

Next, the detection section 14 determines whether or not the frequency of the updated reception errors exceeds the threshold Th2 (step S5). If the frequency of the reception errors caused by the interference is not more than the threshold Th2, the communication apparatus 1 terminates the process. In contrast, if the frequency of the reception errors caused by the interference is more than the threshold Th2, the detection section 14 stores the frequency channel, in which the frequency of the reception errors becomes larger than the threshold Th2, as the unusable frequency channel (step S6).

Like this, the communication apparatus 1 determines that the interference source exists in the frequency channel with this reception performed therein in accordance with the fact that the frequency of the reception errors caused by the interference exceeds a threshold. This determination is based on the following reasons. That is to say, in the case of the wireless LAN, the frequency channel set by hand is continuously used. On the other hand, in the case of the Bluetooth device, the communication apparatus 1 performs the frequency hopping by the independent sequence for each Piconet composed of one master and slaves. Therefore, if two or more Piconets are physically close with one another, a transmitting and receiving operation in a certain Piconet are likely to interfere with the transmitting and receiving operation in another Piconet. However, the frequency hopping is performed with an extremely short time interval, so that further interference is avoided by performing the frequency hopping to the next frequency channel. Accordingly, there is a lack of foundation to estimate that the Bluetooth device is the interference source. Regardless of this fact, if the communication apparatus 1 sets an unusable channel only by the determination of the reception errors caused by the interference several times, the frequency channel in which interference has been caused by another Bluetooth device is erroneously assessed. Therefore, the communication apparatus 1 assesses the frequency channel by using the frequency of the reception errors.

Each frequency channel is assessed by the repetition of the processing in FIG. 3 as described above.

According to the radio communication apparatus regarding the first embodiment of the present invention, if the RSSI value of the reception signal determined as the packet error is larger than a threshold, the receiving operation is determined as the error caused by the interference. Therefore, the communication apparatus can accurately distinguish between the case that packets have not been received because only the received radio signal strength is weak and so on and the case of the reception error caused by the interference. A radio communication apparatus with a high communication quality is achieved by performing the frequency hopping without using the frequency channel accurately determined that the reception error caused by the interference exist therein.

According to the first embodiment, the communication apparatus measures the RSSI value in a receiving operation to use the value to assess the frequency channel. Therefore, differing from the passive assessment system, the consumed power is restricted because the embodiment eliminates the necessity of an additional reception other than the reception of packets. Moreover, differing from the passive assessment system, since this embodiment does not need to measure the RSSI value while the packets are not received, the frequency channel can be assessed even when the packets are continuously transmitted and received.

According to the first embodiment, the frequency of the reception errors caused by the interference is used for an index of the assessment of the frequency channel. Therefore, the frequency channel is not set as an unusable channel because of the interference among the Bluetooth devices. Consequently, the number of the usable frequency channels is not overly limited And according to the first embodiment, the frequency channel determined as an unusable channel is not used until a preset time elapses. Accordingly, the preset time is appropriately set to keep the communication apparatus from switching the usable or unusable state of the frequency channel other than necessary cases.

Second Embodiment

A second embodiment has a configuration in which a preset time input section is added to the first embodiment. The preset time input section is used to set a length of a time in which the frequency channel is not used.

Figure 4:
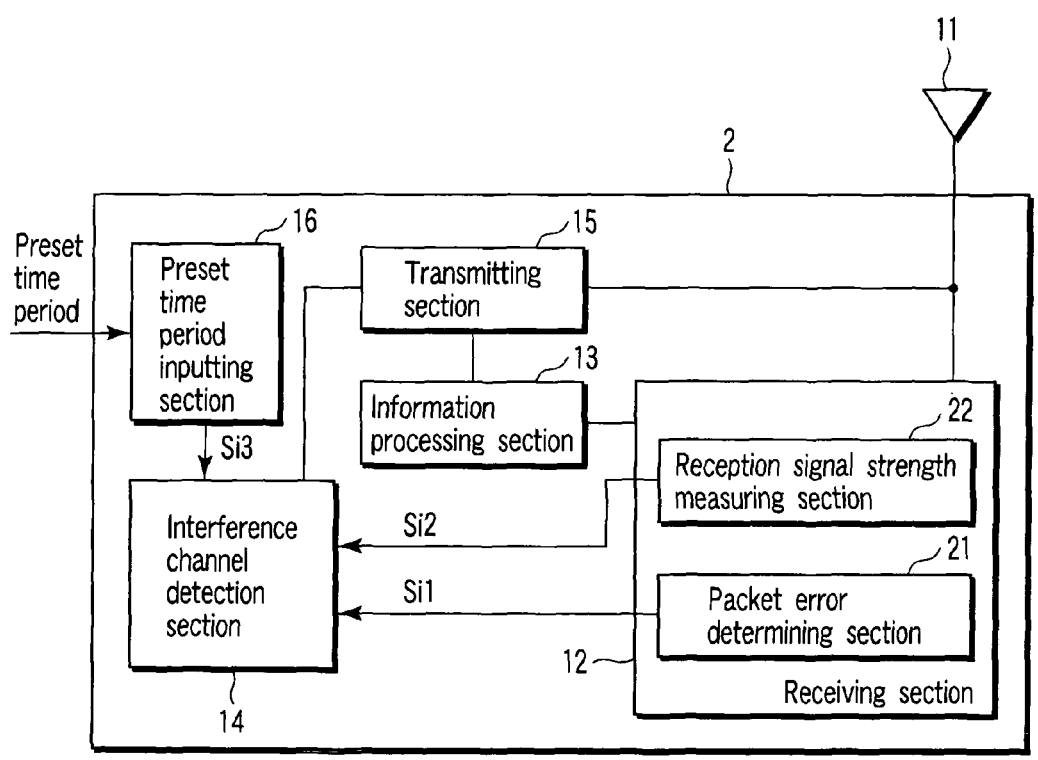
FIG. 4 is a block diagram showing a principal section of a radio communication apparatus regarding a second embodiment of the present invention.

FIG. 4 is the block diagram showing the principal section of the radio communication apparatus regarding the second embodiment of the present invention. As shown in FIG. 4, a radio communication apparatus 2 has a preset time inputting section 16. The inputting section 16 is configured to be able to receive manually input preset time in which the frequency channel determined the interference source exists therein is not used. The inputting section 16 may be composed of a touch panel, a switch and the like. Or, the inputting section 16 may receive input preset time included in an instruction from a program or the like executed in an external device. Thereby, the preset time is varied.

The length of the time, in which the frequency channel set as an unusable frequency channel is not used, varies in optimal value depending on the frequency of a radio wave transmission of surrounding interference source. Therefore, the length of the time is preferred to be set externally. Therefore, the second embodiment has this inputting section 16.

A signal Si3 includes information on the length of the preset time and is output from the inputting section 16. The signal Si3 is supplied to the interference channel detection section 14. The detection section 14 changes the information relating to the usable state or the unusable state of frequency channels in accordance with the information in the signal Si3. The remaining configuration is the same as the first embodiment.

According to the radio communication apparatus regarding the second embodiment of the present invention, as with the first embodiment, when the RSSI value of the reception signal determined as the packet error is larger than a threshold, the frequency channel through which the reception signal has been transmitted is treated as the unusable frequency channel. Therefore, the second embodiment can bring the same advantage as that of the first embodiment.

Furthermore, according to the second embodiment, the time in which the unusable channel is not used can be varied through the inputting section 16. Accordingly, the communication apparatus 2 can achieve an optimum operation in accordance with the surrounding environment.

Note that the first and second embodiments are described with reference to the Bluetooth device as example. However, the present invention is not limited to the case of the Bluetooth device and can be adapted to another radio communication system using the frequency hopping. The present invention is adaptable not only to a radio communication system in the 2.4 GHz band but also adaptable to a radio communication system in another frequency band and a communication system so long as one using the frequency hopping of a wired modem or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus comprising:
   an error detector configured to determine whether a reception packet includes data transmission errors,
   a signal measuring device configured to measure strengths of a signal of the reception packet independently from the determination of the data transmission errors,
   a checking unit configured to assess frequency channels using a result whether the reception packet includes the data transmission errors and based on a strength of the signal, and decide that zero or more of the frequency channels are unusable channel in accordance with a result of an assessment of the frequency channels, and
   a transmission unit configured to transmit a radio signal using one of the frequency channels sequentially without using the unusable channel,
   wherein the checking unit counts the number of incidents in which the reception packet includes the data transmission errors and the strength of the signal of the packet having data transmission errors exceeds a first threshold, calculates frequency of the incident among the number of times of reception of the packet for each of the frequency channels,
   decides zero or more of the frequency channels of which the frequency exceeds a second threshold as the unusable channel, and
   the unusable channel is not used until a preset time elapses, the preset time being variable depending on a frequency of a radio wave transmission of a surrounding interference source.

2. The apparatus according to claim 1, wherein the preset time is input from outside of the apparatus.

3. The apparatus according to claim 1, wherein the checking unit does not calculate a frequency of an incident in which the reception packet includes data transmission errors, and in which the strength of the signal of the reception packet having data transmission errors does not exceed the first threshold.

4. The apparatus according to claim 1, wherein the checking unit decides the frequency channels as the unusable channel regardless of an incident in which the reception packet includes the data transmission errors, and in which the strength of the signal of the reception packet having data transmission errors does not exceed the first threshold.

5. A radio communication apparatus communicating while using one of frequency channels sequentially, comprising:
   a reception error determining section determining whether a reception packet includes data transmission errors and outputting an error signal when the reception packet includes the data transmission errors;
   a reception signal strength measuring section measuring a reception signal strength of the reception packet independently from the determination of the data transmission errors and outputting a strength signal which represents the signal strength of the reception packet;
   an interference channel detection section calculating a frequency of an incident in which the error signal is received and the strength signal exceeds a first threshold among the number of times of reception of the reception packet for each of the frequency channels, and deciding zero or more of the frequency channels in which the frequency of the incident exceeds a second threshold as a unusable channel; and
   a transmitting section transmitting a radio signal using one of the frequency channels sequentially without using the unusable channels, wherein
   the detection section does not use the unusable channel until a preset time elapses, the preset time being variable depending on a frequency of a radio wave transmission of a surrounding interference source.

6. The apparatus according to claim 5, further comprising a preset time inputting section setting the preset time.

7. The apparatus according to claim 5, wherein the interference channel detection section does not calculate a frequency of an incident in which the error signal is received, and in which the strength signal does not exceed the first threshold.

8. The apparatus according to claim 5, wherein the interference channel detection section decides the frequency channels as the unusable channel regardless of an incident in which the error signal is not received, and in which the strength signal does not exceed the first threshold.

9. A radio communication method for communication using one of frequency channels sequentially, comprising:
   receiving a reception packet;
   determining whether the reception packet includes data transmission errors;
   measuring a strength of a signal of the reception packet independently from the step of determining the data transmission errors;
   calculating frequency of an incident in which the reception packet includes the data transmission errors and the strength of the signal of the reception packet having the data transmission errors exceeds a first threshold among the number of times of reception of the reception packet for each of the frequency channels;
   deciding zero or more of the frequency channels in which the frequency of the incident exceeds a second threshold as unusable channel; and
   transmitting a radio signal using one of the frequency channels sequentially without using the unusable channel, wherein the unusable channel is not used until a preset time elapses, the preset time being variable depending on a frequency of a radio wave transmission of a surrounding interference source.

10. The method according to claim 9, wherein the frequency channels are decided regardless of a frequency of an incident in which the strength of the signal of the reception packet having data transmission errors does not exceed the first threshold.

* * * * *